(No Model.)

C. TILLBERG.
EGG COOKER.

No. 543,199. Patented July 23, 1895.

Witnesses:
Frank S. Davis
Emma Lyford

Inventor:
Charles Tillberg
By Geo. J. Murray
Atty

UNITED STATES PATENT OFFICE.

CHARLES TILLBERG, OF TELL CITY, INDIANA, ASSIGNOR OF ONE-HALF TO ALBERT P. FENN, OF SAME PLACE.

EGG-COOKER.

SPECIFICATION forming part of Letters Patent No. 543,199, dated July 23, 1895.

Application filed July 9, 1894. Serial No. 516,932. (No model.)

*To all whom it may concern:*

Be it known that I, CHARLES TILLBERG, a citizen of the United States, and a resident of Tell City, in the county of Perry and State of Indiana, have invented certain new and useful Improvements in Egg-Cookers, of which the following is a specification.

My invention relates to devices for egg-cookers. Its object is to provide a simple inexpensive device by which eggs may be invariable cooked to any degree required, either soft, medium, or hard, with but little attention.

It is well known that roasted eggs have a better flavor than eggs cooked in any other manner, but owing to the difficulty experienced in roasting them to the proper degree this method of cooking eggs is seldom employed. By means of my device the eggs are practically roasted or have, when cooked in my device, the flavor of properly-roasted eggs.

The object of my invention I attain by the the means illustrated in the accompanying drawings, in connection with which it will be first fully described, and then particularly referred to and pointed out in the claims.

Figure 1:
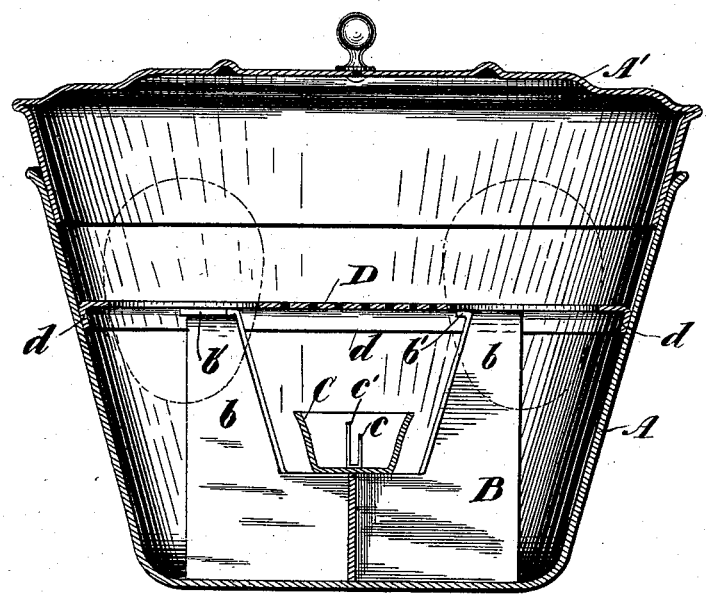
Figure 2:
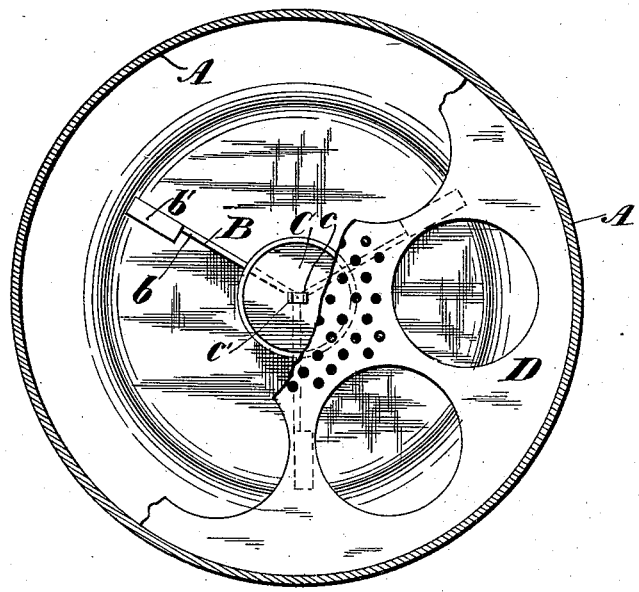

Referring to the drawings, in which like parts are represented by similar reference-letters wherever they occur throughout the different views, Figure 1 is a central vertical sectional view of my egg-cooker. Fig. 2 is a plan view of the same with the cover removed and a portion of the perforated tray broken away to expose the parts below it.

The vessel A, which is preferably made of tin or other light sheet metal, is fitted with a removable cover A', which, when in position, as seen in Fig. 1, renders the vessel practically air-tight.

Resting upon the bottom of the vessel A is a stand or spider B, preferably formed of three wings of sheet metal, centrally connected and radiating from the center, the upper parts being cut away from the top about half way down to furnish a support for the alcohol-vessel C. The upwardly-extending arms $b$, formed by cutting away the wings, have their upper ends turned over, forming the flanges $b'$ to support the perforated tray D. This tray D has downwardly-turned flange $d$ around its periphery to impinge upon the side walls of the vessel A, so as to furnish additional support for the perforated tray, and it is obvious that the upwardly-extending arms $b$ of the spider may be omitted, as the flange $d$ would support the tray without said arms; but it is preferable to use the arms so as to prevent the tray from being wedged too tightly within the inclined body of the vessel A. The tray D has in the form shown six large perforations, two between each of the spider-arms to support the eggs to be cooked, which are shown in dotted lines, Fig. 1, and the center of the tray has a number of small perforations, to allow the fumes from the burning alcohol in the vessel C to pass through to the upper portion of the vessel above the tray.

The vessel C has secured centrally upon its bottom a U-shaped strip or wire, having upwardly-projecting points $c$ and $c'$, the point $c'$ projecting above the point $c$. These points or projections are to serve as gages for the amount of alcohol or other burning fluid employed in the operation of cooking. For a vessel of a size adapted to receive and cook one-half dozen eggs, the alcohol-cup C should be about one inch to one and one-eighth inches in diameter by one-half inch deep, and the smaller point $c$ extends about half way between the bottom and top of the cup and the point $c'$ about three-fourths of the distance. For larger vessels the cup C and gages $c$ and $c'$ should be correspondingly increased.

To use the device, if it is desired to cook the eggs soft alcohol is poured into the cup C until it comes up to the top of the point $c$, a teaspoonful of water is put into the vessel A, the alcohol lighted, and the eggs placed in the tray D. The cover is then placed as shown in Fig. 1 and no further attention is required. When the alcohol is burned out, the eggs are properly cooked and the heat is retained as long as desired, until the eggs require to be used, when the cover is removed and the eggs taken out for use.

If it is required to cook the eggs medium, sufficient alcohol is poured in until it comes to the top of point $c'$, and if they are to be cooked hard the vessel C is filled with alcohol; but in either case only a teaspoonful of water is required in the vessel A.

Of course the gage-points $c$ and $c'$ may be omitted, as experience will teach any one the amount of burning fluid required to perform the operation of cooking them, or the cup C may be graded by an index or lines formed upon the inner surface to accomplish the same result.

Any form of spider for supporting the alcohol-cup may be employed without the upper extending arms, especially if the tapering vessel is employed, the sides of which would support the tray in proper position.

What I claim as new, and desire to secure by Letters Patent, is—

1. In an egg cooker, the combination of the air tight vessel, the graduated alcohol cup, and means such as shown for supporting the eggs within the vessel, substantially as shown and described.

2. The combination of the air tight vessel, the alcohol cup having within it graduating points, and means such as shown for supporting the eggs, substantially as shown and described.

CHARLES TILLBERG.

Witnesses:
THEO. WINTERATT,
AUG. J. OSTER.